Sept. 9, 1952  P. R. VOGT ET AL  2,609,662
CONTROLLED DASHPOT FOR FUEL METERING DEVICES
Filed July 25, 1947  5 Sheets-Sheet 1

Fig. 1.

INVENTORS.
Paul R. Vogt,
Paul T. Nims.
BY
Harness and Harris
ATTORNEYS.

Patented Sept. 9, 1952

2,609,662

UNITED STATES PATENT OFFICE 2,609,662

CONTROLLED DASHPOT FOR FUEL METERING DEVICES

Paul R. Vogt, Grosse Pointe, and Paul T. Nims, Detroit, Mich., assignors to Chrysler Corporation, Highland Park, Mich., a corporation of Delaware Application July 25, 1947, Serial No. 763,576

21 Claims. (Cl. 60—39.28)

This application relates to a control for a burner. More specifically it relates to controlling a burner adapted to supply products of combustion driving a gas turbine.

An object of the present invention is to provide a stabilizing means for a fuel-burning apparatus. The stabilizing means is advantageously used when the fuel-burning apparatus produces hot gases for a gas turbine, whereby the operation of the turbine is stabilized. It has been determined that the gas turbine should be operated at constant temperature; i. e., the temperature of the gas driving the turbine should be constant. At constant-temperature operation the curves of turbine output torque against speed and required torque against speed are so nearly parallel throughout much of the operating range that stable operation at constant speed is virtually impossible without involving the speed governor itself. When the turbine drives an airplane propeller, the propeller speed is governed through pitch control, and so in this case an attempt at stable operation will involve an undue amount of propeller-pitch changing. We propose to eliminate this drawback by providing for allowing small variations from the selected constant temperature of gases driving the turbine. In this way the curve of the turbine torque against speed is caused to intersect the curve of propeller torque against speed, and stable operation is achieved without a variation beyond the speed range allowed by the propeller governor. The means providing for departure from constant-temperature operation of the turbine may take the form of a dashpot that prevents a fuel-regulating means from permitting fuel flow to vary with air flow for changes in air flow of short duration. The dash-pot enables changes in air flow of long duration to have an effect upon the fuel flow.

A further object is to associate with the aforesaid stabilizing means, a means for rendering the stabilizing means ineffective when the change in air flow is sufficient to make the speed vary from the range for which the governor is set.

Another object is to modify the stabilizing means in such a way that it is ineffective when there is a large reduction in air flow. In this way danger to the turbine of too high a temperature is avoided, for the high temperature that would result from the greatly reduced air flow and air unchanged fuel flow is prevented by an immediate reduction of the fuel flow in accordance with the reduction in the air flow.

Other objects will appear from the disclosure.

In the drawings:

Figs. 3–6, inclusive, show other forms of controls of the present invention applied to a fuel-and-air-metering device.

Figure 1:
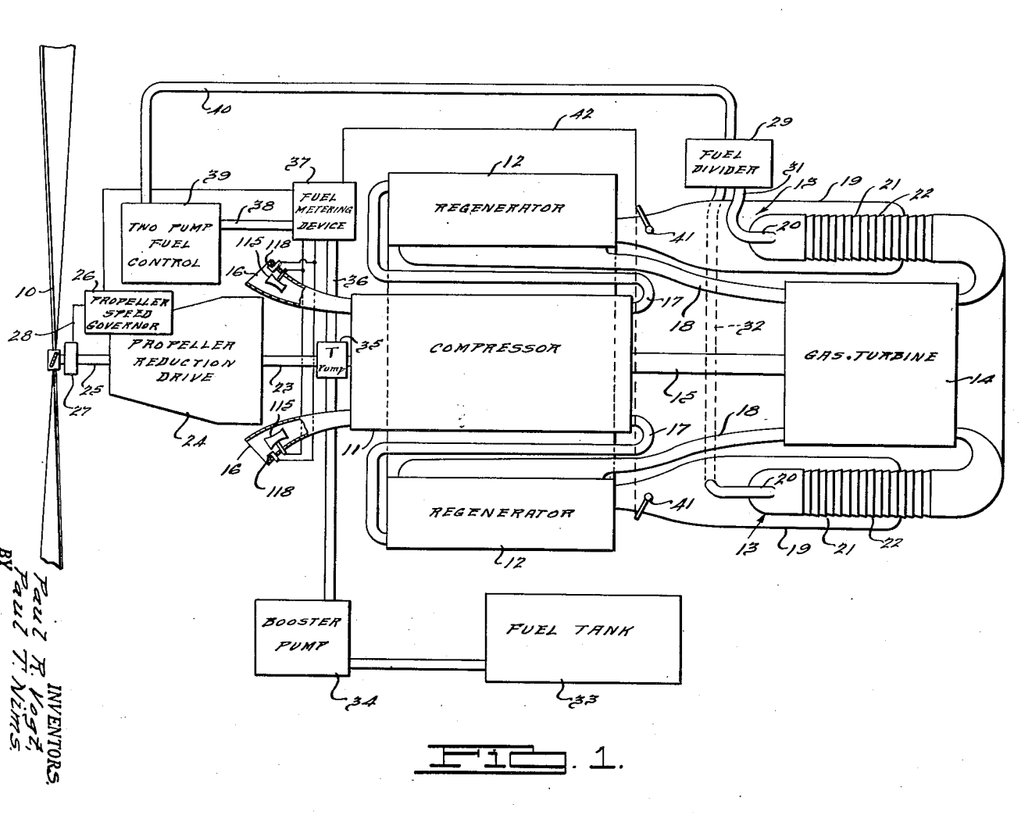
Fig. 1 is a partially diagrammatic view showing a power plant including a gas turbine to which the controls of the present invention are shown to be applied.

Fig. 1 shows a power plant for driving an airplane propeller 10. The power plant comprises a compressor 11, a regenerator 12 surrounding the compressor, a plurality of burners 13, and a gas turbine 14. The gas turbine 14 is driven by hot gases produced by the combustion of fuel and air in the burners 13, and drives the compressor 11 through appropriate connecting means represented by the reference character 15. The compressor 11, which may be of the axial type, draws in air at its left end through scoops 16. Compressed air is delivered from the right end of the compressor 11 into conduit means 17 which lead the compressed air to the regenerator 12. The compressed air follows a zig-zag path through the regenerator 12 and is thereby heated by exhaust gases passing from the gas turbine 14 through conduit means 18 to the regenerator 12. Heated compressed air passes from the regenerator 12 through conduit means 19 which enclose the burners 13. Each burner is formed of a fuel nozzle 20 and an air tube 21 formed at an intermediate portion of nested frustum-like sections 22, which permit the air to pass through the tube wall to the nozzles 20. The tubes 21 are curved at their ends to direct the streams of hot gases formed in the burners 13 toward the end of the gas turbine 14, which is positioned within the burners 13. For a more complete showing of the arrangement of compressor, regenerator, burners, and gas turbine, reference is made to the copending application of Staley and Williams, Serial No. 715,840, dated December 12, 1946. For a more complete showing of the burner tubes 21 with the frustum-like sections 22, reference is made to the copending application of Samuel B. Williams, Serial No. 715,873, filed December 12, 1946.

The compressor 11, which has been previously described as being driven from the gas turbine 14 through means 15, is drivingly connected by means 23 with a propeller reduction drive 24, which in turn drives the shaft 25 on which the propeller 10 is mounted. Thus the propeller 10 is driven from the gas turbine 14 at a reduced speed. A propeller speed governor 26, which includes parts responsive to the speed of the propeller 10, is diagrammatically illustrated as regulating the propeller pitch control means 27 through a connection 28.

Fuel divider 29 is connected with the nozzles 20 through conduits 31 and 32. Fuel is fed from a gas tank 33 to a booster pump 34 and thence to a transfer pump 35. From the transfer pump 35 the fuel is led by a conduit 36 to a fuel-metering device 37. Thence the fuel proceeds by way of a conduit 38 to a two-pump control 39 and thence through a conduit 40 to the fuel divider 29.

The fuel-metering device 37 is responsive to a plurality of controls. In the conduit means 19 is positioned a plurality of elements 41 responsive to temperature of the air passing from the regenerator 12 to the burners 13. The temperature-responsive elements 41 exert a control over the fuel-metering device 37 diagrammatically illustrated in Fig. 1 by the line 42. Each air scoop 16 carries conventional elements 115 and 118 for measuring the rate of air flow through the scoop; the air pressures acting upon these elements are transmitted to the fuel-metering device 37.

Figure 2:
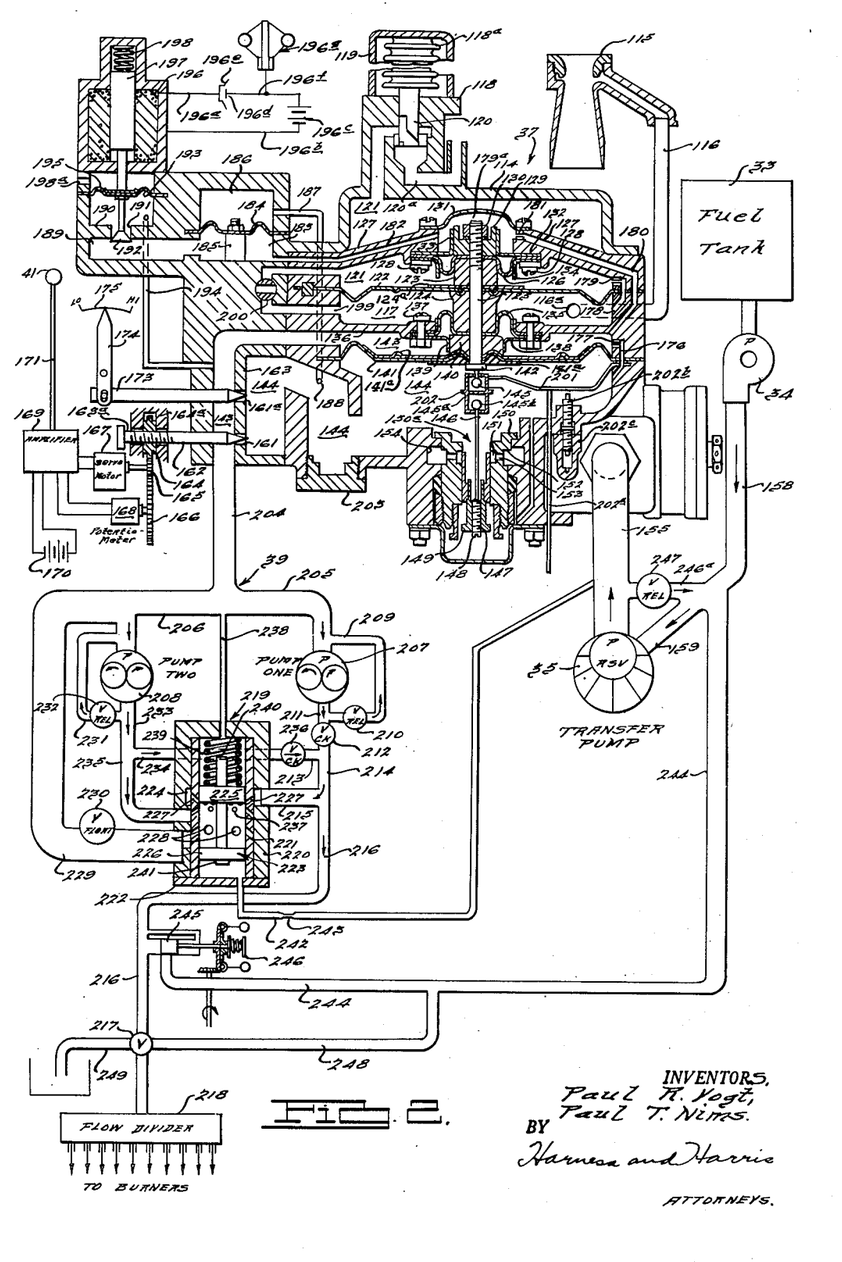
Fig. 2 is a view partially in section showing the application of the controls of the present invention to a fuel-and-air-metering device.

Fig. 2 shows in detail the fuel-metering device 37 and the two-pump control 39. Reference character 114 designates a body which may be formed of several parts and through which fuel is passed for regulating purposes. The body 114 forms part of the metering device 37. The line 116 connects the velocity-pressure-sensing element 115 with the body 114, the line 116 having an opening 116$^a$ to an air chamber 117, formed in the body 114 below a diaphragm 122. The impact-pressure-sensing element 118 is shown to be formed to be part of the body 114 and includes a pressure-compensating nitrogen-filled bellows 118$^a$ mounted on the inside of the top of a container 119. Bellows 118$^a$ contains nitrogen at some pressure dependent on conditions such as the spring rate of the bellows and compensates for temperature and pressure. The bellows 118$^a$ contracts with pressure and expands with temperature and therefore, assumes a position dependent upon density, since density is proportioned to the ratio of pressure to temperature. A valve 120 is connected with the nitrogen bellows 118 and is adjustably positioned by the bellows to establish a restriction in a line 120$^a$ transmitting the signal received by the pressure element 118 to an air chamber 121 formed in the body 114 above the diaphragm 122, mounted within the body 114. The pressure of air sensed by the element 118 is transmitted to the upper side of this diaphragm, and the pressure sensed by the element 115 is transmitted to the lower side of the diaphragm. Whenever air is flowing, the pressure on the upper side of the diaphragm 122 will be greater than the pressure on the lower side thereof, and the difference in these pressures is a measure of the square of the air flow. The diaphragm 122 is held between a collar 124 and a ribbed disk washer 124$^a$ mounted upon a rod 125. Above the washer is a collar 123, above which is a diaphragm 126, which is secured to bridge portions 127 of the body 114 by screws 128. The collar 123 and a collar 129 clamp the diaphragm 126. The collar 129 has a recess receiving a nut 130 having threaded engagement with the rod 125. The bridge portions 127 are connected by a cover 131 which extends over the top of the rod 125. Clamped between the diaphragm 126 and the bridge portions 127 is a guide 132 having a flange 133 in which the collar 129 slides. The diaphragm 126 is retained in a flanged support 134, which is clamped to the bridge portions 127 by the screws 128. The collar 124 rests in a diaphragm 135, which closes an opening in a wall 136 dividing the body into an air section and a fuel section. Bolts 137 secure the diaphragm 135 to the wall 136. These bolts also support a guide 138 having a flange 139 receiving a collar 140. Collar 140 holds a diaphragm 141 against a ribbed disk washer 141$^a$, which rests against a shoulder 142 on the rod 125. The various diaphragms and collars just described are held clamped between the shoulder 142 on the rod 125 and the nut 130 engaging the upper threaded end of the rod 125. The diaphragm 141 divides the fuel section into a metered-fuel chamber 143 and an unmetered fuel chamber 144. The lower end of the rod 125 is formed as a ball 145, which is mounted in a connecting means 145$^a$, which also mounts a ball 145$^b$ on the upper end of a rod 146. The lower end of the rod 146 has a threaded portion 147 and a slot 148 for adjusting purposes. The threaded portion 147 engages a movable inner sleeve valve 149, which is slidably mounted in a fixed outer sleeve valve 150. The valves 149 and 150 comprise an adjustable regulating valve 150$^a$.

Figures 3, 4:
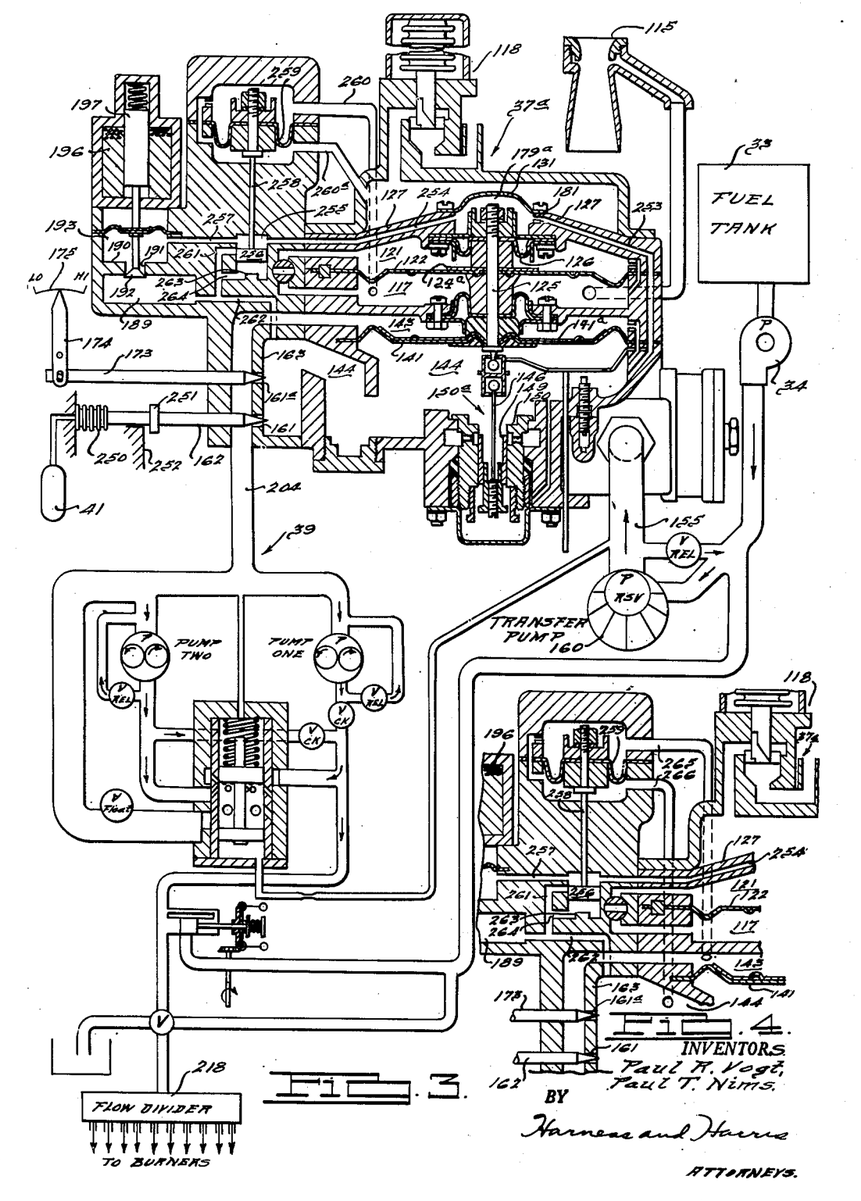

The outer valve 150 has an inner annular recess 151, an outer annular recess 152, and connecting radial openings 153. As shown in Fig. 3, the inner valve 149 partially overlaps the inner recess 151 of the outer valve so as to restrict the openings formed therein. The outer annular recess 152 of the outer valve 150 is in registry with an annular recess 154 formed in the body 114. The recess 154 is in communication through means not shown, with a supply conduit 155. Fuel comes from the fuel tank 33 to the booster pump 34, which may be of the centrifugal type. Thence it proceeds by way of conduits 158 and 159 to the transfer pump 35, which may be of the rotary sliding vane type. The pump 35 delivers fuel through the conduit 155 to the recess 154 in the body 114. Thence the fuel proceeds through the regulating orifice formed of the sleeves 149 and 150 to the unmetered-fuel chamber 144 in the body 114 below the diaphragm 141. The unmetered-fuel chamber has two outlets for fuel to the metered-fuel chamber 143, comprising orifices 161 and 161$^a$ formed in a wall 163. The effective size of the orifice 161 is controlled by a needle valve 162, the longitudinal position of which is adjustable for variation of the size of the orifice 161. The needle valve 162 has a threaded portion 163$^a$, which is engaged by an internally threaded portion on a gear 164, which is held against conjoint axial movement with the needle valve 162 by a supporting means 164$^a$ which embraces the gear 164. The needle valve 162 is held against rotational movement by means of a square hole in the casing 114 and a square portion on the needle valve, which is received by the square hole in the casing. The gear 164 is driven by a gear 165, in turn driven by a servo-motor 167. The gear 165 also drives a gear 166 controlling a potentiometer 168. The servo-motor 167 and the potentiometer 168 are suitably connected by wires with an amplifier 169, which is supplied by an electrical source of power 170. The amplifier receives a suitable electrical signal from the temperature-responsive elements 41, only one being shown in Fig. 2. The needle valve 162 regulates the fuel orifice 161 in such a way that the size of the orifice varies inversely with the temperature of the air supplied to the burners, as measured by the element 41. The signal received through the means 171 from the temperature-sensitive element 41 is suitably magnified by the amplifier 169 by the electrical energy received from the source of power 170. Changes in the electrical signal, thus amplified cause the servo-motor 167 to rotate the gear 165. Rotation of the gear 165 is effective by way of the gear 164 to provide longitudinal adjustment of the needle valve 162 and thereby adjustment of the fuel orifice 161. Rotation of the gear 165 is also effective by way of the gear 166 to adjust the potentiometer 168 to restore the entire electrical apparatus to balance. In other words, with the change in electrical signal, the servo-motor 167 will operate to rotate the gear 165 indefinitely unless compensation is provided in an adjustment of resistance, and this is done through adjustment of the potentiometer 168 by the gear 166.

The fuel orifice 161a is regulated by means of a longitudinally adjustable needle valve 173, to which is connected a pivotally mounted indicator 174, having a point moving along suitable indicia 175, representing desired temperature of combustion products delivered by the burners to the gas turbine. The indicator 174 and needle valve 173 are shown in a mean position. Movement of the needle valve to the left, produced by clockwise angular movement of the indicator, increases the effective opening of the fuel orifice 161 and thereby increases the temperature to be reached by the products of combustion of the burners going to the turbine. Movement of the needle valve 173 to the right produced by counterclockwise angular movement of the indicator 174 will decrease the effective opening of the fuel orifice 161a and thereby decrease the temperature of the products of combustion produced by the burners.

The fuel chambers 143 and 144 above and below the diaphragm 141 are placed in communication by a passage 176 formed in the body 114 and having a restriction 177. Similarly, the air chambers 117 and 121 are placed in communication by a passage 178 formed in the body 114 and having a restriction 179. The metered fuel chamber 143 is in communication with a chamber 179a for fuel formed by the cover 131, the bridge portions 127, and the diaphragm 126. Communication is established through a passage 180 formed in the body 114 and having a restriction 181 at the end adjacent the chamber 179a. A passage 182 connects the chamber 179a with a chamber 183, formed below a diaphragm 184 carrying a projection 185 limiting the lower position of the diaphragm 184. Above the diaphragm 184 is a chamber 186, which communicates by a line 187 with the unmetered fuel chamber 144 through an opening 188. The chamber 183 is connected with a chamber 189 positioned below the wall 190 having an orifice 191 closed by a valve 192, as shown in Fig. 2. Above the wall 190 is a chamber 193, which communicates through a line 194 with the metered-fuel chamber 143. The top of the chamber 193 is formed by a diaphragm 195, which is connected to the stem of the valve 192 and prevents fuel from going from the chamber 193 into a solenoid 196. The solenoid 196 controls the valve 192 through a plunger 197, secured to the stem of the valve 192 in axial alignment therewith. The solenoid 196 is supplied by wires 196a and 196b from a source of electrical power 196c. Between the wire 196a and source 196c is connected a speed-responsive switch, which comprises spaced terminals 196d and 196e, connected to the line 196a, and a contactor arm 196f, controlled by a means 196g responsive to turbine speed. More specifically, the means 196g may be associated with the propeller-pitch-control governor. Propeller speed is directly proportional to turbine speed. The propeller is normally constructed so that a certain pitch produces a given speed range of propeller. Different speed ranges may be preselected, and thus a position of the arm 196f between the contacts 196d and 196e may be produced by different selected speed ranges.

The arrangement is such that, when the turbine is operating in the desired speed range, the contactor 196f is positioned between the terminals 196d and 196e and out of contact with each of them so that no current flows to the solenoid 196. Under this condition, fuel pressure acting upwardly against the diaphragm 195 causes the plunger 197 to be displaced upwards from a central position in the solenoid 196 and the valve 192 to close the orifice 191, all as shown in Fig. 2. When the turbine is not operating in the desired speed range, the arm 196f will contact one of terminals 196d and 196e, causing current to be supplied to the solenoid 196, which now moves the plunger 197 downward to a central position and opens the valve 192, placing the chambers 189 and 193 in communication. A spring 198 acts against the plunger 197 to urge it downwards and thereby provides compensation for a fuel pressure in the fuel chamber 193. The space above the diaphragm 193 is vented by an opening 198a. The air chambers 117 and 121 are connected by a passage 199, which is shown to be closed by a valve 200. A spring 201 is connected at its right end to the body 114 below the diaphragm 141 in the unmetered-fuel chamber 144. The left end of the spring 201 is engageable with a flange 202 formed on the connecting means 145a so as to provide a yielding limit to upward movement of the stems 125 and 146 and a minimum opening of the regulating orifice 150a, formed by the valves 149 and 150. A rod 202a slidably mounted in the body 114 may be moved upwardly from the position shown to lift the spring 201 and thereby to remove the lower limit on the size of the regulating orifice 150a. A threaded member 202b, mounted in the body 114, provides an adjustable stop engageable with the spring 201 so as to determine the position the spring will assume when the rod 202a is out of the way, as shown in Fig. 2. A removable cover 202c protects the threaded member 202b. The fuel chamber has a drain plug 203.

A fuel line 204 extends from a region of the metered fuel chamber 143 immediately to the left of the fuel orifices 161 and 161a. The line 204 splits into branches 205 and 206, which lead to pumps 207 and 208, which may be of the gear type. A relief line 209 is connected to opposite sides of the pump 207 and contains a relief valve 210. The pump 207 discharges through a line 211 and a check valve 212 from which lead lines 213 and 214. The line 214 is formed into two branches 215 and 216. The latter line leads through a valve 217 to a flow divider 218 from which separate lines go to individual burners. The line 215 forms part of a bypass for pump 207 and leads to a valve 219 formed of a body 220, a sleeve 221 positioned therein, a cover 222 and a balanced piston valve 223 slidable within the sleeve 221. The line 215 leads directly to an annular recess 224 formed in the body 220 about the sleeve 221. The annular recess 224 communicates with the space between sections 225 and 226 of the piston valve 223 by way of passages 227 formed in the sleeve 221. Passages 228 in sleeve 221 provide communication from the space between the piston valve sections 225 and 226 and a drain line 229 leading back to the line 206. The drain line 229 carries a float valve 230 for eliminating from the line any trapped fuel vapors. The pump 208 is provided with a relief line 231 which is connected to opposite sides of the pump and carries a relief valve 232. A conduit 233 leads from the discharge side of the pump 208 and separates into two branches 234 and 235. The branch 234 is connected by a check valve 236 with the branch 213 associated with the pump 207. The branch 235 leads to the valve body 220 and communicates with the chamber between the piston valve sections 225 and 226 by means of openings 237 formed in the sleeve valve 221. The space above the piston valve 223 is connected by a line 238 with the conduit 204 and subjects the top side of the piston valve to the fuel pressure in the line 204. A coil spring 239 acts against the top of the piston valve 223 to urge it downwardly. An extension 240 formed on the top of the piston valve 223 limits upward movement of the piston valve. A short extension 241 formed on the lower side of the piston valve 223 limits its downward movement. The space below the piston valve 223 is connected by a line 242 having a restriction 243 to the discharge side of the transfer pump 35. Fundamentally, the control valve 219 for the pumps 207 and 208 operates from the difference in intake and discharge pressures at the apparatus included in body 114, for the upper end of piston valve 219 is subjected to the discharge pressure of the apparatus existing in line 204 and the lower end of the piston valve is subjected to the intake pressure of the apparatus existing in line 155 as communicated by line 242. Restriction 243 removes the effect of variations of intake fuel pressure of short duration and also dampens oscillations of piston valve 219 from other causes. Spring 239, acting on the upper end of the piston valve 223 assures that the piston valve assumes a certain position along the length of the valve sleeve 221 for a given difference in intake and outlet fuel pressures as transmitted to the ends of the piston valve.

A return line 244 leads from the line 216 to the conduit 159 on the intake side of the transfer pump 35. Communication between the lines 216 and 244 is regulated by a piston valve 245 under the control of a speed governor 246 responsive to turbine speed. A relief line 246ª containing a relief valve 247 connects the intake and discharge sides of the transfer pump 35. A line 248 leads from the line 244 to the valve 217. A drain line 249 is connected to the valve 217. During normal operation the valve 217 passes fuel from the line 216 to the fuel divider 218. The valve is so constructed that when appropriately regulated, it connects the flow divider with the line 249 for draining the former and lines 216 and 248 for passing the entire flow of fuel to the discharge side of the transfer pump 35.

In operation of the above described apparatus, fuel is drawn from the fuel tank 33 through the booster pump 34 through conduits 158 and 159, the transfer pump 35, and the conduit 155 to the body 114, through which it passes to the annular recess 154 and thence through the orifice 153 and annular recesses 151 and 152 in the outer fixed sleeve valve 150 and past the upper edge of the movable inner sleeve valve 149 to the portion of the unmetered-fuel chamber 144 below the diaphragm 141. From there the fuel moves to the metered fuel chamber 143 to the left of wall 163 by way of the orifices 161 and 161ª, the sizes of which are regulated in accordance with temperature of air going to the burners, as measured by the element 41, and by desired temperature of products of combustion going from the burners to the gas turbine, as predetermined by an appropriate setting of the indicator 174. The orifices 161 and 161ª jointly constitute metering orifice means, and the pressure of the fuel is reduced in accordance with the amount of restriction provided at these orifices by the needle valves 162 and 173, which adjust the orifices. Since the unmetered-fuel pressure is greater than the metered-fuel pressure, the diaphragm 141 will be urged upwardly with a force dependent upon the difference between these two fuel pressures, which difference is in turn dependent upon the square of the flow of fuel past the orifice 161 and 161ª. The upward net force through fuel-pressure difference acting upon the diaphragm 141 is communicated to the rod 125. This upward force on the rod is opposed by a downward force on the rod dependent upon the difference in air pressures acting upon the upper and lower sides of the diaphragm 122 in the air chambers 117 and 121 and transmitted thereto from sensing elements 115 and 118. When the flow of fuel is proper for the flow of air, the air-pressure difference acting downwardly upon the diaphragm 122 is effectively balanced by the fuel-pressure difference acting upwardly on the diaphragm 141. Thus the valve 149 holds its position, and there is no change in the size of the regulating orifice formed by the valves 149 and 150. Let it be assumed, for the moment, that the valve 192 is open. If the flow of air to the burners changes in rate, this change will be sensed by the elements 115 and 118, and a changed difference in pressure will be transmitted to the diaphragm 122. If the rate of air flow increases, there will be a greater air pressure difference acting downwardly upon the diaphragm 122, and for the moment the upward fuel-pressure difference acting upon the diaphragm 141 will be effectively less than the air pressure difference acting upon the diaphragm 122. As a result, the rods 125 and 146 will move downwards causing the upper end of the movable sleeve valve 149 to provide less of a restriction to the recesses and passages in the outer fixed valve 150. Thus there is an increase in the size of the regulating orifice, and consequently, the flow of fuel increases. Since the fuel flow increases, the drop in pressure across the orifices 161 and 161ª increases, and thus there is provided a greater fuel pressure difference acting upwards upon the diaphragm 141. When the increase in fuel-pressure difference effectively matches the increase in air-pressure difference, downward movement of the valve rods 125 and 146 and of the inner sleeve valve 149 ceases. Thus a new fuel flow has been established, which is appropriate to the new increased air flow. If the air flow decreases, the opposite of the above described takes place. The effective force of the fuel pressure difference acting upwardly upon the diaphragm 141 is greater than the effective force of the air pressure difference acting downwardly upon the diaphragm 122, and therefore, the rods 125 and 146 and the inner sleeve valve 149 move upwardly. This action decreases the size of the regulating orifice 150ª formed by the valve parts 149 and 150, and the fuel flow decreases. Thus the fuel-pressure drop across the orifices 161 and 161ª is decreased, and a lower upward pressure acts against the diaphragm 141. Thus balance is restored between the air-pressure difference acting on the diaphragm 122 and the fuel-pressure difference acting on the diaphragm 141.

During the above described changes it has been presumed that the valve 192 was open, and this was the case if the turbine was not in the desired speed range, so that the solenoid was electrically energized to bring the core 197 to its lower position. Let it now be assumed that the turbine is operating in the desired speed range. Now the solenoid 196 is no longer energized, and the plunger 187 brings the valve 192 to closed position under the influence of the fuel pressure acting upwards against the diaphragm 195. Now fuel in the chamber 179a cannot escape by way of the line 182, chambers 183 and 189, orifice 191, chamber 193 and line 194, and the only outlet from the chamber 179a is through the passage 180, but this passage has the restriction 181, which provides a time delay to such escape. Thus the volume of fluid in the chamber 179a cannot change suddenly, and the diaphragm 126 cannot shift its position suddenly. Consequently, the rods 125 and 146 and the inner sleeve valve 149 cannot immediately move upwardly or downwardly in response to changes in air flow as transmitted as a pressure difference to the diaphragm 122. The rods and valve 149 can move only if there is sufficient time for fuel to flow through the restricted orifice 181 into or out of the fuel chamber 179a. Thus changes in air flow of a short duration have no effect upon the fuel flow, for temporarily the inner sleeve valve 149 remains in its original position, and there is no change in the size of the regulating orifice. Keeping the fuel apparatus from being sensitive to air-flow changes of a short duration prevents unstable operation of the apparatus, which may easily occur if the controls are made sensitive to changes of a short duration in the use of the apparatus with the power plant shown in Fig. 1.

If the air flow decreases sufficiently, the rod 125 will be urged upwardly with sufficient force to cause the compression of the trapped fuel in the chamber 179a to act against the diaphragm 184 sufficiently to lift it and thereby to provide the appropriate increase in space for the trapped fuel to permit the upward movement of the rods 125 and 146 and the inner sleeve valve 149 for reduction of the regulating orifice. Lifting of the diaphragm 184 takes place when the pressure in the chamber 179a has through compression risen from metered fuel pressure up to or just above the unmetered-fuel pressure existing above the diaphragm 184. Thus for a large reduction in air flow there will be immediately provided an appropriate reduction of fuel flow as a precaution against overheating of the turbine due to too high a temporary rate of fuel-flow rate to air-flow rate. The fuel flow will not immediately be reduced completely to the point where the ratio of fuel to air flow is the predetermined value, because this ratio can be obtained only when the pressure in the chamber 179a is the same as that in chamber 117, and this pressure will be equal only when sufficient fuel has escaped from the chamber 179a, and this requires time. The error represented by the difference between the fuel flow actually existing under this condition and the theoretically correct fuel flow for the actual air flow will be always approximately the same percentage of the fuel flow, since the diaphragm 184 is subjected to the difference between metered and unmetered-fuel pressures, which is a measure of fuel flow. A large increase in air flow will not immediately have the same effect, because the resultant increase in downward thrust upon the air diaphragm 122 will only tend to increase the volume of fuel trapped against immediate release from the space 179a and associated parts. This will tend to move the diaphragm 184 downwards to achieve compensation by reduction of the size of the chamber 183, but the projection 185, attached to the diaphragm prevents downward movement of the diaphragm.

Under starting conditions, it may be desirable to use a lower rate of fuel flow than may be allowed by the minimum position established by the idle spring 201. In this event, the rod 202a is pushed upwards to raise the spring 201 and thereby to permit the inner sleeve valve 149 to move upwards in response to the air-pressure difference arising from low air flow and thereby reduce the regulating orifice to make possible the new desired minimum fuel flow. At other conditions it may be desirable to have a constant fuel flow, for example, a minimum flow permitted by the return of the idle spring 201 to the position shown in Fig. 2, regardless of the air conditions measured by the elements 115 and 118. In this event, the valve 200 is turned 90° from the position shown in Fig. 2 to place the portions of the air chambers 117 and 121 in direct communication with one another for equalizing as much as possible, the air pressures on the two sides of the diaphragm 122.

It has previously been assumed that the effective size of the metering orifice 161 has remained constant, because the temperature of air flowing to the burners has not changed, and therefore, the temperature-responsive element 172 has not acted through various described control means to adjust the longitudinal position of the needle valve 162. If now the temperature of air going to the burners increases, the needle valve 162 is moved to the right, reducing the effective size of the orifice 161. This means a greater restriction of the fuel flowing past the orifices and consequently, a lower fuel-flow rate for a given pressure drop across the orifice. As the size of the orifice 161 is decreased, the pressure drop may, for the moment, increase and this produces an upward movement of the rods 125 and 146 and the valve 149. Thus there is a reduction in flow through the regulating orifice formed of the valve parts 150 and 151, and this reduction in flow brings about a reduction in pressure difference across the orifices 161 and 161a to obtain a return of the original fuel pressure difference acting on the diaphragm 141 to match the air-pressure difference acting on the diaphragm 122. Thus the rate of air flow has remained the same, but the rate of fuel flow has been decreased as the temperature of air flowing to the burners has increased. Thus the ratio of fuel to air has decreased, whereby there is provided a suitable balance for the increase of air temperature in maintenance of a constant temperature of products of combustion leaving the burners. Decrease in the temperature of air flowing to the burners has the opposite effect. In this case, the needle valve 162 moves to the left increasing the effective opening of the orifice 161. Thus the restriction of the flow of fuel across orifices 161 and 161a is decreased, and there may be a similar pressure drop across these orifices. The decrease in pressure drop is transmitted to the diaphragm 141, which now receives less force to oppose the force applied by air pressure difference to the diaphragm 122, and the rods 125 and 146 and the valve sleeve 149 may move downwards to increase the size of the regulating orifice formed by the valve sleeves 150 and 151. This produces an increased fuel flow, increasing the pressure drop across the orifices 161 and 161a to restore balance between the fuel-pressure forces acting against the diaphragm 141 and air-pressure forces acting on diaphragm 122. Thus the air-flow rate has remained the same, while the fuel flow rate has increased, and so there has been provided an increase in the ratio of fuel flow to air flow. Thus there is provided a compensation for the decrease in the temperature of air flowing to the burner in maintenance of a constant temperature of products of combustion flowing from the burners to the turbine.

If a greater temperature is desired for the products of combustion passing from the burners to the turbine, indicator 174 is moved to a clockwise direction thereby moving the needle valve 173 to the left and increasing the effective size of the orifice 161ª. Thus, for the moment, the pressure drop across the orifice is reduced for the flow of fuel remains constant, and the fuel-pressure difference acting upwardly against the diaphragm 141 is reduced. Thus the balance between the air-pressure forces and the fuel pressure forces is disturbed, and thus sleeve valve 149 moves downwardly increasing the regulating orifice formed between the valves 149 and 150. This increases the fuel flow and the pressure drop across the orifices 161 and 161ª. Thus balance is restored between the diaphragms 122 and 141. The air-flow rate has remained the same, and the fuel flow rate has increased. Thus there is an increase in the ratio of fuel flow to air flow, and since the temperature of air flowing to the burners has been assumed to remain constant, the increase in ratio of fuel to air must result in a greater temperature of products of combustion produced by the burner. Similarly the temperature of products of combustion may be reduced by greater restriction of the orifice 161ª by the needle valve 173.

After the fuel passes through the metering orifices 161 and 161ª, it goes through the conduit 204 to the pumps 207 and 208. If the pump 207 is functioning properly, the entire output of the pump 208 will be bypassed, with the parts in the position shown in Fig. 2, through the openings 237, the space between the piston valve sections 225 and 226, the sleeve openings 228, and the return line 229 back to the intake side of the pump 208. A portion of the output of the pump 207 will be bypassed through the line 215, the sleeve openings 227, the space between the piston valve sections 225 and 226, the valve sleeve openings 228, and the return line 229 to the intake side of either pump 208 or pump 207. The portion of the pump 207 that is not bypassed as aforesaid, is delivered through the line 216 and the valve 217 to the flow divider 218, whence it proceeds to the individual burners. The position of the valve 223 will determine the relative portions of the output of the pump 207 that are bypassed through the line 215 and delivered to the burners through the line 216. The position of the valve 223 is determined by the pressure of fuel above the valve piston section 225, which is determined by the difference between the pressure existing in the line 204 leading to the pumps 207 and 218 and the pressure in line 242, with the aid of a coil acting against the valve piston section 225. The force inserted by spring 239 is substantially constant in all positions and is adapted to balance a difference in pressure normally always existing between line 242 and line 204. If it be assumed that the pressure in line 242 is constant, and this is generally the case, then the greater the pressure in the line 204, the lower the position of the valve 223, the more the piston valve section 225 covers the ports 227, the less the amount of output by the pump 207 bypassed through the line 215 and the sleeve valve openings 227, and the greater the amount of the output of the pump 207 going through the line 216 to the flow divider 218 and to the openings. Thus there is a tendency to maintain the constant pressure in the line 204 or on the intake side of the pumps 207 and 208, for the greater this pressure becomes, the greater the relative amount of the pump output delivered to the burners. If pump 207 fails, presumably the output pressure of the pump falls very low, and the fuel pressure on the intake side reaches a high level. Consequently, two things happen: pump 208 delivers fuel through line 234, check valve 236, and lines 213, 214, and 216 to the flow divider 218; and the piston valve 223 is depressed under the increased fuel pressure in the line 204 until the sleeve valve openings 227 are completely closed, and the sleeve valve openings 237 are at least partially closed, thereby reducing the amount of fuel bypassed from pump 208 by way of line 235 and return line 229. If pump 207 again functions properly, pressure in the line 204 will be sufficiently lowered as a result of fuel delivered by pumps 207 and 208 to cause the piston valve 223 to rise until the output of pump 208 is bypassed by virtue of complete uncovering of the valve openings 237, and a portion of the output of pump 207 may be bypassed by a partial uncovering of the valve openings 227.

Fig. 3 shows a modified form of fuel-metering device 37ª. Like the metering device 37 of Fig. 2, the present device 37ª includes air-pressure-sensing elements 115 and 118, and air diaphragm 122, on opposite sides of which are air chambers 121 and 117, a fuel diaphragm 141, on opposite sides of which are a metered-fuel chamber 143 and an unmetered-fuel chamber 144, and a regulating valve 150ª, comprising an outer valve part 150 and an inner valve part 149, regulated by the air and fuel diaphragms 122 and 141 through rods 125 and 146. The fuel-metering device 37ª is supplied by a transfer pump 160 which is in turn supplied by a booster pump 157, which receives fuel from a tank 156.

The body of the metering device 37ª has an interior wall 163 carrying metering orifices 161 and 161ª. The orifice 161 is controlled by a needle valve 162, which is adjusted in longitudinal position for adjustment of the sides of the orifice 161, by a thermostatic element 250 operated from the temperature-responsive 41. The needle valve 162 carries a shoulder 251, which is engageable with a stop 252 to limit the leftward movement of the needle valve 162 and thereby the size of the metering orifice 161. The element 41 is responsive to the temperature of air traveling from the regenerator 12 to the burners 13, and therefore, the needle valve 162 is adjusted to make the size of the metering orifice 161 vary inversely with the temperature of the air traveling from the regenerator to the burners. The size of the orifice 161ª is controlled by a needle valve 173, manually settable by a pivoted indicator 174 moving along suitable indicia 175. The longitudinal position of the needle valve 173 predetermines, as designated on the indicia 175, the temperature of the gases delivered by the burners 13, all as in Fig. 2.

The metering device body of Fig. 3 carries bridge portions 127, which support a cap 131 and a diaphragm 126 and form therewith a chamber 179ª for fuel. The metering device of Fig. 3 differs from that of Fig. 2 in that a passage 253 leading from the chamber 179ᵃ through the restriction 181 leads to the unmetered fuel chamber 144 below the fuel diaphragm 141, rather than to the metered fuel chamber. An unrestricted passage 254 leads from the fuel chamber 179ᵃ to a cylindrical opening 255 in which is reciprocally mounted a piston 256. A passage 257 leads from the cylindrical opening 255 on the side opposite the passage 254 to a chamber 193 formed below the diaphragm 195 and above a wall 190. The wall 190 has an opening 191 shown closed by a valve 192 under control of a solenoid 196 operating upon a plunger 197 formed as an extension of the rod of the valve 192. Below the wall 190 is a chamber 189. The solenoid-operated valve 192 and the associated parts just described are the same in Fig. 3 as in Fig. 2.

Piston 256 is connected by means of a rod 258 with a diaphragm 259, subjected above and below through the line 260 and 261 to the air pressures existing in the air chambers 117 and 121, below and above the air diaphragm 122. The diaphragm 259 urges the piston 256 upwards with a force indicative of the air flowing to the burners. A passage 261 leads from the intermediate portion of the cylindrical opening 255 to a passage 262 leading from the chamber 189 to the unmetered-fuel chamber 144. A projection 263 is formed in the base of the cylindrical opening 255. The relief passage 264 leads from the base of the cylindrical opening 255 to the passage 261. Fuel is delivered from the metering device 37ᵃ of Fig. 3 through a conduit 204 to a two-pump system 39 like the one in Fig. 2 and thence to the flow divider 218.

The general operation of the devices 37ᵃ of Fig. 3 is like that of the device 37 of Fig. 2. Fuel reaches the device 37ᵃ from the transfer pump 160 upward of the conduit 155. The regulating valve 150ᵃ determines the amount of fuel flowing and is adjusted by the air diaphragm 122, which is responsive to the amount of air flowing, and the fuel diaphragm 141 which is responsive to a drop in fuel pressure across the metering orifices 161 and 161ᵃ. When the gas turbine 14 or the propeller 10 is not operating in a predetermined speed range, the solenoid 196 causes the plunger 197 to occupy a central position, thereby causing the valve 192 to open the passage 191. Under these conditions, when the air and fuel diaphragms 122 and 141 move the inner valve part 149 up or down to maintain a predetermined ratio of fuel-flow rate to air-flow rate, there is no interference to such movement of the diaphragms and inner valve part 149 offered by the chamber 179ᵃ, for fuel may enter or leave the chamber 179ᵃ freely by way of the opening 191.

However, when the turbine or the propeller is operating in a desired speed range, the effect on the solenoid 196 is such as to bring the plunger 197 to the displaced position of Fig. 3 and the valve 192 to the position of Fig. 3 in which it closes the opening 191. Now fuel can enter or leave the chamber 179ᵃ only by way of the passage 253 with its restriction 181. Since the entrance or exit of fuel can take place through the restriction 181 only slowly, the diaphragm 126 forming one wall of the chamber 179ᵃ moves only slowly and permits the inner valve part 149 to move only slowly. Thus the inner valve part 149 is not sensitive to any air flow changes of short duration, which would impose change in forces of short duration acting upon the air diaphragm 122.

Assume now that there is a large reduction in air flow. This will result in a large reduction in the net downward force of air acting upon the air diaphragm 122. This will cause the fuel forces to urge the fuel diaphragm 141 upwardly, resulting in an attempted compression of the fuel contained in the volume composed of chamber 179ᵃ, lines 254 and 257, the space in cylindrical opening 255 above piston 256, and chamber 193. Since the decrease in air pressure difference acting upon the air diaphragm 122 is large, the compression of the fuel contained in the aforesaid volume including the upper part of the cylindrical opening 255 will be large, and when it is large enough to overcome the upward forces on the piston 256 imposed thereon by the diaphragm 259 in response to the amount of air flowing, the piston 256 will move downwardly to allow escape of the compressed fuel through the passages 261 and 262 to the unmetered fuel chamber 144. Since fuel can now escape from the chamber 179ᵃ and associated passages and chambers upward of the lines 261 and 262, the diaphragm 126 may move upwardly and with it the inner valve part 149, reducing the fuel flow in conformance with the greatly reduced air flow. Reduction in fuel flow in response to a large reduction in air flow is provided so that the turbine will not overheat because of too high a ratio of fuel to air in the burners. It will be understood that while the volume including the chamber 179, the passages 254 and 257, the chamber 193, and the space above the piston 256 in the cylindrical opening 255 is undergoing compression sufficient to depress the piston 256 to allow escape of fuel from the aforesaid volume by way of the lines 261 and 262, and the fuel flow rate is being reduced thereby in conformance with reduction in air-flow rate, the fuel-flow rate will not be reduced sufficiently to provide the predetermined ratio of fuel-flow rate to air-flow rate for which the metering orifices 161 and 161ᵃ are set, for the release of compressed fluid by way of the passages 261 and 262 can be effected only when the fluid in the chamber 179ᵃ is under compression, and yet the opposition provided by way of compression in the chamber 179ᵃ will prevent the inner valve part 149 from reaching the position requisite for maintenance of the predetermined ratio of air-flow rate to fuel-flow rate. Under these conditions the error between the actual fuel-flow rate and a theoretical fuel-flow rate matching the greatly reduced air-flow rate and maintenance of the predetermined ratio of air to fuel will be a substantially constant percentage of the amount of fuel flowing, for the upward air force on the diaphragm 259 acting through the piston 256 to prevent release of the compressed fuel in the chamber 179ᵃ by way of the passages 261 and 262 is proportional to air flow and in turn to fuel flow and determines the amount of error between actual fuel flow and theoretical fuel flow.

When the air flow increases a great amount, there is no need for a sudden appropriate increase in fuel flow, since the temperature of the turbine will decrease rather than dangerously increase, because of reduction in fuel to air ratio. Greatly increased air flow will cause the air diaphragm 122 to attempt to move downwards, attempting to bring the diaphragm 126 downwards and to increase the volume of trapped fuel including the chamber 179ᵃ. This attempted volume increase will move the piston 256 up slightly, but will provide no opening of the passage 261 for entry of fuel to match the attempted volume increase.

Reference has been made in the next to the last paragraph to the fact that the diaphragm 259 responsive to air forces indicative of air flow, urges the piston 256 upwardly and thereby provides an error between actual fuel flow and theoretical fuel flow under a condition of greatly reduced air flow. Fig. 4 shows a modified device in which the diaphragm 259 is subjected to metered fuel pressure and unmetered fuel pressure by way of lines 265 and 266 connected with the fuel chambers 143 and 144. In this modification the upward force imposed upon the piston 256 through the diaprhagm 259 is proportional to fuel flow rather than air flow, but the result is approximately the same.

Figure 5:
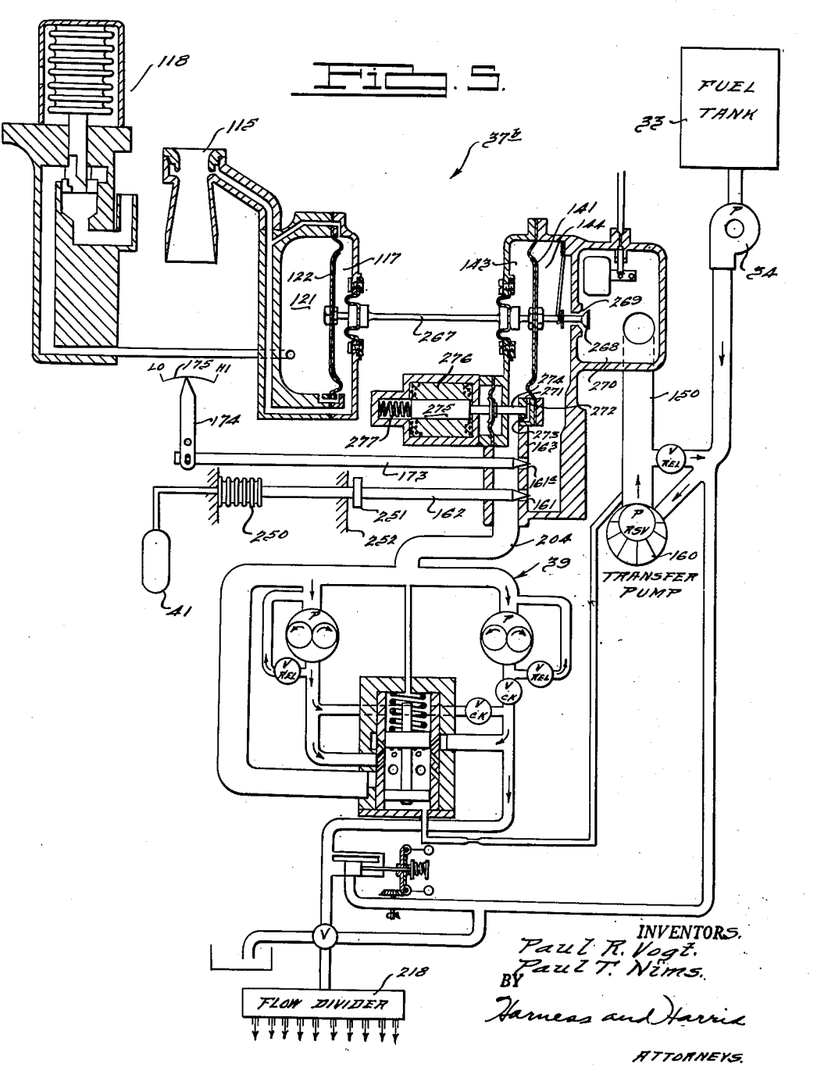

In Fig. 5 there is shown a third modified form of fuel-metering device, with which there are associated, as is the case with metering devices 37 and 37ᵃ of Figs. 2 and 3, air flow measuring elements 115 and 118, an air diaphragm 122, on opposite sides of which are air chambers 117 and 121, a fuel diaphragm 141, on opposite sides of which are fuel chambers 143 and 144, and a wall 163 in which are formed metering orifices 161 and 161ᵃ. The orifice 161 is adjusted in size by means of a needle valve 162, which is controlled by a thermostatic element 250 responding to temperature measured by the element 41 of the air flowing from the regenerator 12 to the burners 13. Thus the orifice 161 is made to vary inversely with the temperature of the air flowing from the regenerator to the burners. A shoulder 251 formed on the needle valve 162 engages a stop 252 to limit leftward movement of the needle valve 162 and thereby the amount of opening of the metering orifice 161. Longitudinal adjustment of the needle valve 173 through an indicator 174 moving along appropriate indicia 175 adjusts the predetermined temperature of products of combustion delivered by the burners 13 to the turbine 14. The less the metering orifice 161ᵃ is restricted by the needle valve 173, the greater the aforesaid predetermined temperature of products of combustion. The air and fuel diaphragms 122 and 141 are connected with a rod 267, which carries at its right end a regulating valve 268 controlling the size of a regulating orifice 269, which provides an opening for fuel from a receiving chamber 270 formed in the fuel-metering device 37ᵇ to the unmetered fuel orifice 144.

The metering-device 37ᵇ of Fig. 5 differs principally from the previously described metering devices in that the metered fuel chamber 143 may be blocked or restricted to provide the desirable delay to response of the fuel-flow rate of short duration. An extension 271 of the wall 163 is provided with a passage 272 having a restriction 273. A valve 274 is shown in Fig. 5 to be blocking unrestricted escape of fuel from the metered fuel chamber 143. The valve 274 is controlled by a plunger 275 formed as an extension of the valve 274 and operating under the influence of solenoid 276 and a spring 277. When the turbine or the propeller is operating in the desired speed range the valve 274 is in closed position, as shown in Fig. 5, so that escape or entrance from or to the metered fuel chamber 143 is had only by way of the restricted passage 272. Fuel trapped in the metered fuel chamber 143 provides resistance to any attempted movement of the regulating valve 268 occasioned by changes in air-flow rate. The changes in air-flow rate will be effective to change the fuel-flow rate only if they last long enough for the fuel to enter or exit slowly through the restricted passage 272. The operation of the solenoid 276 on the valve 274 is reversed from the operation of the solenoids of Figs. 2 and 3 with respect to their valves. The valve 274 is in closed position when current flowing to the solenoid 276 causes the plunger 275 to occupy a central position, as shown in Fig. 5. This requires an electrical circuit somewhat modified or reversed from that shown in Fig. 2, but it is believed unnecessary to show such circuit, since it forms per se no part of the present invention.

Fuel is delivered from the metering device 37ᵇ through a line 204 to a two-pump system 39 like the one in Fig. 2 and thence to a flow divider 218.

In Fig. 6 there is a fuel-metering device 37ᶜ, which is somewhat similar to those of Figs. 2 and 3, but differs slightly therefrom. The device of Fig. 6 includes air-measuring elements 115 and 118, an air diaphragm 122, on opposite sides of which are air chambers 117 and 121, a fuel diaphragm 141 on opposite sides of which are fuel chambers 143 and 144, and a regulating valve 150 formed of a movable inner valve part 149 and a stationary outer valve part 150. The air and fuel diaphragms 122 and 141 act through rods 125 and 146 to control the position of the inner valve 149 in maintenance of a predetermined air-to-fuel ratio. Fuel passes from a gas tank 156 to a booster pump 157, thence to a transfer pump 160 and thence by way of a conduit 155 to the fuel-metering device 37ᶜ. The device contains an inner wall having metering orifices 161 and 161ᵃ. The orifice 161 is adjusted to vary inversely with temperature or air flowing from regenerator 12 to the burners 13 and the orifice 161ᵃ is adjusted to vary directly with the desired temperature of products of combustion flowing from the burners 13 to the turbine 14. The body of the device 37ᶜ has bridge portions 127 which carry a cap 131 and a diaphragm 126 and forms therewith a chamber 179ᵃ for fuel. A passage 278 having a restriction 279 at the end adjacent the chamber 179ᵃ leads from the said chamber through one bridge portion 127 to the unmetered fuel chamber 144. A passage 279 leads from the chamber 179ᵃ through the other bridge portion 127 to a chamber 280, of which the top is formed of a diaphragm 281. An opening 287 connects the chamber 280 with a chamber 283. The chamber 283 has an upper wall 284 provided with an opening 285 shown closed by a valve 286. One end of the rod of the valve 286 is formed as a plunger 287 controlled by solenoid 288 and a spring 289. Formed between the wall 284 and a sealing diaphragm 290 is a chamber 291, which is connected by a passage 292 with a chamber 293 formed above the diaphragm 281. The solenoid 288 is adapted to be controlled by means similar to that shown in Fig. 2 for controlling the solenoid 196. Fig. 6 shows the valve 286 to be closed when the plunger 287 is in raised or displaced position because of the pressure of the fuel in the chamber 291 acting on the diaphragm 290. The valve and plunger are so positioned when the turbine or propeller is operated in a desired speed range and at this time the solenoid 288 is not energized. When the turbine or propeller is not being operated in the desired speed range, the solenoid is energized to lower the plunger 287 and valve 286. A coil spring 294 acts between a wall 295 and the diaphragm 281 to urge the diaphragm downwards. Downward movement of the diaphragm 281 is limited to the position shown in Fig. 6 by members 296 and 297 secured respectively to the diaphragm 281 and the wall 295 and having slotted end portions engaging one another in such a way as to permit upward movement of the member 296 and the diaphragm 281 from the position shown.

When, as previously stated, the speed of the turbine or the propeller is not in a predetermined desired range, the valve 286 is displaced downwardly from the position shown in Fig. 6, causing the passage 285 to be opened. Thus when there is upward or downward movement of the air diaphragm 122 in response to changes in air flow, the inner valve part 149 of the regulating valve 150ª may move upwards or downwards to adjust the fuel flow in maintenance of a predetermined ratio of air-flow rate to fuel-flow rate. Fuel in the chamber 179ª is not forced to escape or enter the chamber 179ª by way of the restriction 279 and the passage 278, but may escape or enter by way of the passage 279, chamber 280, passage 287, chamber 283, opening 285, chamber 291, and line 298 connecting the chamber 291 and the unmetered fuel chamber 144. Under these conditions the fuel-flow rate is adjusted immediately in response to changes in air-flow rate even of short duration. When the turbine or propeller is operating in the desired speed range, the valve 286 closes the opening 285, and now fuel in the chamber 179ª is forced to escape or enter by way of the restriction 279. Thus the responsiveness of the inner valve part 249 to changes in air-flow rate is slowed, and the fuel-flow rate is kept constant in spite of changes in air-flow rate of short duration. If the air-flow rate is reduced a large amount, the reduction in downward force acting upon the air diaphragm 122 will allow the continuing upward force upon the fuel diaphragm 141 to attempt to move the inner valve part 149 and the diaphragm 126 upwards. The result is a compression of the fuel in the container or volume formed of the chamber 179ª, the passage 279, the chamber 280, the opening 287, and the chamber 283. Since the upward force on the diaphragm 126 is larger because of a large reduction in air flow, the compression of the fuel in the aforesaid volume or container is sufficient to raise the fuel force acting upwards on the diaphragm 281 an amount greater than the force of the spring 294. The result is that the diaphragm 281 moves upward and thereby allows the diaphragm 126 to move upwards and accomplish an immediate reduction in fuel flow in response to the large reduction in air flow. This arrangement prevents the turbine from being overheated because of a temporary excessive air-fuel ratio. If there is a large increase in air flow, there is not an immediate large increase in fuel flow, and there is no need for such increase in fuel flow, because the resultant reduction in air fuel ratio will not endanger the turbine by overheating. Since the notched ends of the parts 296 and 297 controlling the diaphragm 281 will not allow it to move downwards from the position in Fig. 6, any large increase in air flow, necessarily resulting in an increased downward force on the air diaphragm 122, would not immediately bring a downward movement of the inner valve part 149 for providing a greater fuel flow, since the diaphragm 126 could move downwards immediately only if the diaphragm 281 could move downwards immediately, and this is impossible, as previously stated.

Fuel is delivered from the metering device 37ᶜ through a conduit 204 to a two-pump system 39 like the one shown and described with reference to Fig. 2, and thence to a flow divider 218.

The term "air" when used in the claims is intended to mean any appropriate combustion-supporting medium.

We claim:

1. In a power plant comprising a gas turbine, a speed responsive device driven at a speed proportionate to turbine speed, a burner for supplying combustion products to drive the gas turbine, means forming a path for the flow of fuel to the burner, means forming a path for the flow of air to the burner, and a flow regulator for the fuel path including a shiftable control device, and means for transmitting to the control device in opposition to one another forces representative of air-flow rate and of fuel-flow rate to shift the control device in one direction or another in accordance with a positive or negative difference between these forces for making the flow regulator adjust the fuel-flow rate in maintenance of a predetermined ratio of fuel-flow rate to air-flow rate; the combination with the control device, of means for delaying the shifting thereof to produce stable operation of the power plant by minimizing the effect on the fuel-flow rate of changes in the air-flow rate of short duration, and controlled means controlled by said speed responsive device for reducing the effectiveness of the aforesaid delaying means during operation of the turbine in other than a predetermined speed range.

2. The combination specified in claim 1, the delaying means comprising a container for fluid having outlet provided with restriction, and the effectiveness-reducing means for the delaying means serving to remove restriction from the outlet of the container.

3. In a power plant comprising a burner, means forming a path for the flow of fuel to the burner, means forming a path for the flow of air to the burner, and a flow regulator for the fuel path including a shiftable part responsive to air-flow rate and fuel-flow rate for effecting shift of the part to adjust the fuel-flow rate in maintenance of a predetermined ratio of fuel-flow rate to air-flow rate; the combination with the shiftable part, of means for delaying the shifting thereof to produce stable operation of the power plant by minimizing the effect on the fuel-flow rate of changes in the air-flow rate of short duration, said delaying means comprising a chamber defined by wall structure consisting of expansible walls movable as a unit with said part and fixed orificed walls having valving associated therewith, said expansible walls permitting the part to take a position in correspondence with said predetermined ratio at a limited rate controlled solely by the degree of orificial effect allowed by said valving.

4. The combination specified in claim 3, the delaying means further comprising a fuel path passage opening adjacent the valving to provide fuel for subjecting the valving to force of a more restrictive tendency.

5. In a power plant comprising a burner, means forming a path for the flow of fuel to the burner, means forming a path for the flow of air to the burner, a machine driven by products of combustion of fuel and air coming from the burner, and a flow regulator for the fuel path including a part and means including moving walls sensitive to air-flow rate and fuel-flow rate for shifting the part to adjust the fuel-flow rate in maintenance of a predetermined ratio of fuel-flow rate to air-flow rate; the combination with the flow regulator, of means for delaying the shifting thereof to produce stable operation of the machine by eliminating the effect on the fuel-flow rate of changes in the air-flow rate of short duration, said delaying means including fixed walls and one said moving wall forming an expansible liquid container having an opening restricted so as to slow any volume change of the container by only slowly passing liquid, and means connecting the moving wall of the container and the shiftable part for causing the slowness of volume change of the container to delay shifting of the shiftable part, and automatic means responsive to operation of the machine in other than a desired speed range for reducing the effectiveness of the delaying means by removing the ability of the restricted opening to slow volume changes of the container.

6. In a power plant comprising a burner, means forming a path for the flow of fuel to the burner, means forming a path for the flow of air to the burner, and a flow regulator for the fuel path including a shiftable part and means including moving walls sensitive to air-flow rate and fuel-flow rate for shifting the part to adjust the fuel-flow rate in maintenance of a predetermined ratio of fuel-flow rate to air-flow rate; the combination with the flow regulator, of means for delaying the shifting thereof to minimize the effect on the fuel-flow rate of changes in the air-flow rate of short duration and including fixed walls and a said moving wall forming an expansible liquid container having an opening restricted so as to slow any volume change of the container by only slowly passing liquid, and means connecting the moving wall of the container and the shiftable part for causing the slowness of volume change of the container to delay shifting of the shiftable part.

7. In a power plant comprising a burner, means forming a path for the flow of fuel to the burner, means forming a path for the flow of air to the burner, and a flow regulator for the fuel path including a shiftable part and means responsive to air-flow rate and fuel-flow rate for shifting the part to adjust the fuel-flow rate in maintenance of a predetermined ratio of fuel-flow rate to air-flow rate; the combination with the shiftable part, of means for delaying the shifting thereof to produce stable operation of the power plant by minimizing the effect on the fuel-flow rate of changes in the air-flow rate of short duration, and means responsive to a large reduction in air-flow rate for reducing the effectiveness of the delaying means.

8. In a power plant comprising a burner, means forming a path for the flow of fuel to the burner, means forming a path for the flow of air to the burner, a machine driven by products of combustion of fuel and air coming from the burner, and a flow regulator for the fuel path including a part and means responsive to air-flow rate and fuel-flow rate for shifting the part to adjust the fuel-flow rate in maintenance of a predetermined ratio of fuel-flow rate to air-flow rate; the combination with the shiftable part, of means for delaying the shifting thereof to produce stable operation of the power plant by minimizing the effect on the fuel-flow rate of changes in the air-flow rate of short duration, means for reducing the effectiveness of the delaying means during operation of the turbine in other than a predetermined speed range, and means responsive to a large reduction in air-flow rate for reducing the effectiveness of the delaying means.

9. In a power plant comprising a burner, means forming a path for the flow of fuel to the burner, means forming a path for the flow of air to the burner, a machine driven by products of combustion of fuel and air coming from the burner, and a flow regulator for the fuel path including a part and means responsive to air-flow rate and fuel-flow rate for shifting the part to adjust the fuel-flow rate in maintenance of a predetermined ratio of fuel-flow rate to air-flow rate; the combination with the shiftable part, of means for delaying the shifting thereof to produce stable operation of the machine by minimizing the effect on the fuel-flow rate of changes in the air-flow rate of short duration, said delaying means comprising an expansible liquid container having an opening restricted so as to slow any volume change of the container by only slowly passing liquid, and means connecting the container and the shiftable part for causing the slowness of volume change of the container to delay shifting of the shiftable part, and means responsive to operation of the machine in other than a desired speed range for reducing the effectiveness of the delaying means by removing the ability of the restricted opening to slow volume changes of the container.

10. In a power plant comprising a burner, means forming a path for the flow of fuel to the burner, means forming a path for the flow of air to the burner, means forming a metering orifice in the fuel path, means forming a regulating orifice in the fuel path and including a part shiftable for adjustment of the size of the regulating orifice, air and fuel diaphragms connected with the shiftable part, means for transmitting to opposite sides of the air diaphragm air pressures having a difference indicative of air-flow rate in the air path, and means for transmitting to opposite sides of the fuel diaphragm metered and unmetered fuel pressures at the sides of the metering orifice, the shiftable part being shifted in accordance with the difference between the aforesaid air-pressure difference and the aforesaid fuel-pressure difference for maintaining a given ratio of fuel-flow rate to air-flow rate, the combination therewith, of means for delaying shifting of the shiftable part to produce stable operation of the power plant by minimizing the effect on the fuel-flow rate of changes in the air-flow rate of short duration, said delaying means comprising an expansible container for fuel having an opening connected with the fuel path on the metered side of the metering orifice and restricted so as to slow any volume change by only slowly passing fuel, and means connecting the container, the air and fuel diaphragms, and the shiftable part to cause the slowness of volume change of the container to produce the aforesaid delay in shifting of the shiftable part, means responsive to operation of the machine in other than a desired speed range for reducing the effectiveness of the delaying means by removing the ability of the restricted opening to slow volume changes of the container, a diaphragm forming a wall of the container, and means for connecting the diaphragm side outward of the container to the fuel path on the unmetered side of the metering orifice, whereby a large change in air-flow rate immediately changes the fuel-flow rate by causing the shiftable part to act through an attempted volume change of the container to raise the fuel pressure of the container to the unmetered fuel pressure on the outward side of the container diaphragm and thereby to move the latter to accommodate shifting of the shiftable part without change in volume of the container.

11. In a power plant comprising a burner, means forming a path for the flow of fuel to the burner, means forming a path for the flow of air to the burner, means forming a metering orifice in the fuel path, means forming a regulating orifice in the fuel path and including a part shiftable for adjustment of the size of the regulating orifice, air and fuel diaphragms connected with the shiftable part, means for transmitting to opposite sides of the air diaphragm air pressures having a difference indicative of air-flow rate in the air path, and means for transmitting to opposite sides of the fuel diaphragm metered and unmetered fuel pressures prevailing at the sides of the metering orifice, the shiftable part being shifted in accordance with the difference between the aforesaid air-pressure difference and the aforesaid fuel-pressure difference for maintaining a given ratio of fuel-flow rate to air-flow rate, the combination therewith, of means for delaying shifting of the shiftable part to produce stable operation of the power plant by minimizing the effect on the fuel-flow rate of changes in the air-flow rate of short duration, said delaying means comprising an expansible container for fuel having an opening connected with the fuel path on the metered side of the metering orifice and restricted so as to slow any volume change by only slowly passing fuel, and means connecting the container, the air and fuel diaphragms, and the shiftable part to cause the slowness of volume change of the container to produce the aforesaid delay in shifting of the shiftable part, means responsive to operation of the machine in other than a desired speed range for reducing the effectiveness of the delaying means by removing the ability of the restricted opening to slow volume changes of the container, a diaphragm forming a wall of the container, means for connecting the diaphragm side outward of the container to the fuel path on the unmetered side of the metering orifice, whereby a large decrease in air-flow rate immediately decreases the fuel-flow rate by causing the air diaphragm to act through an attempted volume decrease of the container to raise the fuel pressure of the container above the unmetered fuel pressure on the outward side of the container diaphragm and thereby to move the latter to accommodate shifting of the shiftable part without change in volume of the container, and means preventing inward movement of the diaphragm container to prevent a large increase in air-flow rate from immediately increasing the fuel-flow rate.

12. In a power plant comprising a burner, means forming a path for the flow of fuel to the burner, means forming a path for the flow of air to the burner, means forming a metering orifice in the fuel causing an unmetered fuel pressure on the up-stream side of the orifice to be higher than a metered fuel pressure on the downstream side of the orifice, means forming a regulating orifice in the fuel path and including a shiftable part, and means for transmitting to the shiftable part in opposed relation a force proportional to the difference between unmetered and metered fuel pressures as a measure of fuel-flow rate and a force indicative of air-flow rate to shift the shiftable part in maintenace of a given ratio of fuel-flow to air-flow rate, the combination therewith, of means for delaying shifting of the shiftable part to produce stable operation of the power plant by minimizing the effect on the fuel-flow rate of changes in the air-flow rate of short duration, said delaying means comprising an expansible container having an opening connected with the metered fuel and restricted so as to slow any volume change by only slowly passing fuel, and means connecting the container and the shiftable part to cause the slowness of volume change of the container to produce slowness in shifting of the shiftable part, the container having a movable wall, and means for subjecting the outer side of the movable wall to unmetered fuel pressure, whereby a large decrease in air-flow rate immediately decreases the fuel-flow rate by causing the shiftable part in response to the change in air force transmitted to the shiftable part to act through an attempted volume decrease of the container to raise the value of the fuel pressure of the container from metered fuel pressure to the unmetered fuel pressure on the outer side of the container wall and thereby to move the latter to accommodate shifting of the shiftable part without change in volume of the container.

13. In a power plant comprising a burner, means forming a path for the flow of fuel to the burner, means forming a regulating orifice in the fuel path and including a shiftable part, means for shifting the shiftable part in accordance with a difference in forces indicative of fuel-flow rate and air-flow rate in said fuel and air paths in order to maintain a given ratio of air-flow rate to fuel-flow rate, the combination therewith, of means for delaying the shifting of the shiftable part to produce stable operation of the power plant by minimizing the effect on the fuel-flow rate of changes in the air-flow rate of short duration, said delaying means comprising an expansible container having an opening connected with the fuel path and restricted for slowing volume changes of the container by passing fuel only slowly, and means for transmitting the slowness of volume change of the container to the shiftable part as slowness of shifting thereof, and means for causing a large reduction in air-flow rate immediately to reduce fuel-flow rate, said last mentioned means comprising a valve openable under increase in fuel pressure in the container to provide unrestricted escape of fuel from the container, means connecting the fuel path with the valve to cause fuel pressure to oppose opening of the valve, and means transmitting to the valve a force varying with air-flow rate to oppose opening of the valve.

14. In a power plant, the combination specified in claim 13 and further comprising means for providing an unrestricted opening in the container in response to operation of the power plant in other than a predetermined speed range.

15. In a power plant comprising a burner, means forming a path for the flow of air to the burner, means forming a path for the flow of fuel to the burner, and means for regulating fuel flow to maintain a predetermined ratio of fuel flow rate to air flow rate; the combination therewith, of means for delaying the responsiveness of the regulating means to produce stable operation of the power plant by minimizing the effect on the fuel-flow rate of changes in the air-flow rate of short duration, and including valve-controlled fluid-confining means adapted to confine a mass of damping fuel, and automatic means for automatically opening the valve of the last said valve-controlled means for reducing the effectiveness of the delaying means in response to operation of the power plant in other than a predetermined range.

16. In a power plant comprising a burner, means forming a path for the flow of air to the burner, means forming a path for the flow of fuel to the burner, and means for regulating fuel flow to maintain a predetermined ratio of fuel-flow rate to air-flow rate; the combination therewith, of means for delaying responsiveness of the regulating means to produce stabe operation of the power plant by minimizing the effect on the fuel-flow rate of changes in the air-flow rate of short duration, and means for modifying the action of the delaying means to make the regulating means immediately responsive to a large change in air-flow rate.

17. In a power plant comprising a burner, means forming a path for the flow of air to the burner, means forming a path for the flow of fuel to the burner, and means for regulating fuel flow to maintain a predetermined ratio of fuel-flow rate to air-flow rate; the combination therewith, of means for delaying responsiveness of the regulating means to produce stable operation of the power plant by minimizing the effect on the fuel-flow rate of changes in the air-flow rate of short duration, means for reducing the effectiveness of the delaying means in response to operation of the power plant in other than a predetermined range, and means for modifying the action of the delaying means to make the regulating means immediately responsive to a large change in air-flow rate.

18. In a power plant comprising a burner, means forming a path for the flow of air to the burner, means forming a path for the flow of fuel to the burner, means forming a regulating orifice in the fuel path and including a shiftable part, and means for shifting the shiftable part in accordance with variation from a predetermined value of the ratio of fuel-flow rate to air-flow rate in order to maintain the ratio at the said predetermined value, the combination therewith, of means for delaying the shifting of the shiftable part to produce stable operation of the power plant by minimizing effects on fuel-flow rate of changes in air-flow rate of short duration, said delaying means comprising an expansible container having an opening connected with the fuel path and restricted for slowing change in the volume of the container by passing fuel only slowly, and means for connecting the container and the shiftable part, and means for preventing the delaying means from interfering with immediate shifting of the shiftable part in response to a large reduction in air-flow rate, said last mentioned means comprising a movable wall associated with the container means for transmitting pressure of the fuel path to the exterior of the wall, and resilient means acting against the wall to oppose outward movement thereof.

19. In a power plant comprising a burner, means forming a path for the flow of air to the burner, means forming a path for the flow of fuel to the burner, means forming a regulating orifice in the fuel path and including a shiftable part, and means for shifting the shiftable part in accordance with variation from a predetermined value of the ratio of fuel-flow rate to air-flow rate in order to maintain the ratio at the said predetermined value, the combination therewith, of means for delaying the shifting of the shiftable part to produce stable operation of the power plant by minimizing effects on fuel-flow rate of changes in air-flow rate of short duration, said delaying means comprising an expansible container having an opening connected with the fuel path and restricted for slowing change in the volume of the container by passing fuel only slowly, and means for connecting the container and the shiftable part, and means for preventing the delaying means from interfering with immediate shifting of the shiftable part in response to a large reduction in air-flow rate, said last mentioned means comprising a movable wall associated with the container, means for transmitting pressure of the fuel path to the exterior of the wall, means forming a chamber on the outer side of the wall, means for transmitting pressure of the fuel path to the chamber and to the exterior of the movable wall, resilient means acting between the movable wall and a portion of the chamber opposite the movable wall to oppose outward movement thereof, and means loosely connecting the movable wall and the said opposite chamber portion to limit inward movement of the movable wall while permitting outward movement thereof.

20. In a power plant comprising a burner, means forming a path for the flow of air to the burner, means forming a path for the flow of fuel to the burner, means forming a metering orifice in the fuel path, a flow regulator for the fuel path including a shiftable part, means responsive to air-flow rate and connected with the shiftable part, and a diaphragm connected with the shiftable part and being subjected on one side to unmetered fuel pressure in the fuel path above the metering orifice and on the other side to metered fuel in the fuel path below the metering orifice, whereby the shiftable part is shifted to adjust the fuel-flow rate in maintenance of a predetermined ratio of fuel-flow rate to air-flow rate; the combination therewith, of means forming with the metered-fuel-pressure side of the fuel diaphragm a container having a restricted opening adapted by only slowly passing fuel to slow volume change of the container and movement of the diaphragm and thereby to produce stable operation of the power plant by minimizing the effect on the fuel-flow rate of change in the air-flow rate of short duration.

21. In a power plant, the combination specified in claim 20 and further comprising means responsive to operation of the power plant in other than the desired speed range for providing an unrestricted opening in the container thereby to reduce the effectiveness of the restricted opening in slowing volume change of the container and movement of the diaphragm.

PAUL R. VOGT.
PAUL T. NIMS.

REFERENCES CITED

The following references are of record in the file of this patent:

UNITED STATES PATENTS

| Number | Name | Date |
|---|---|---|
| 2,384,282 | Chandler | Sept. 4, 1945 |
| 2,409,446 | Pavlecka et al. | Oct. 15, 1946 |
| 2,423,183 | Forsyth | July 1, 1947 |
| 2,457,595 | Orr, Jr. | Dec. 28, 1948 |

FOREIGN PATENTS

| Number | Country | Date |
|---|---|---|
| 493,174 | Great Britain | Oct. 4, 1938 |